United States Patent Office.

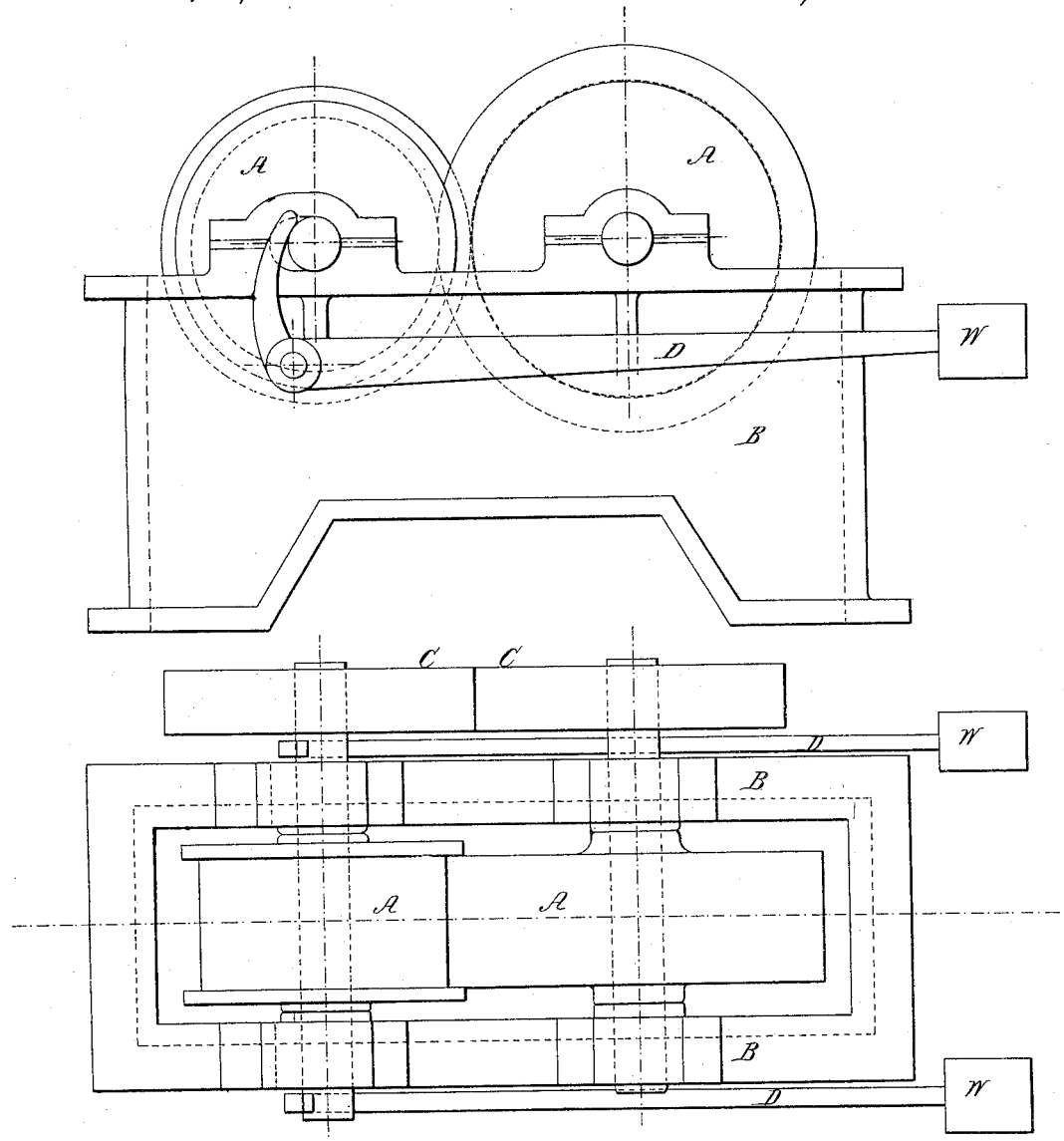

JOHN PLAYER, OF PHILADELPHIA, PENNSYLVANIA.

Letters Patent No. 95,933, dated October 19, 1869.

---

IMPROVEMENT IN THE MANUFACTURE OF IRON AND STEEL.

---

The Schedule referred to in these Letters Patent and making part of the same.

---

*To all whom it may concern:*

Be it known that I, JOHN PLAYER, of the city and county of Philadelphia, in the State of Pennsylvania, have invented a new and useful Process or Method of Treating Cast-Iron as a Preparation for Converting it into Steel or Malleable Iron; and I hereby declare that the following is a full, clear, and exact description thereof.

It is well known that the essential difference between cast-iron, for example, as it comes from the hearth of the blast-furnace, and steel, and malleable or wrought-iron, consists in the presence, in the former, of an excess of carbon, and of many impurities, some of which are unavoidably imparted to the iron from the fuel used in the smelting. The most important and troublesome of these impurities are sulphur and phosphorus, and the leading object of all the manipulations which iron, after it leaves the blast-furnace, undergoes, as a preparation to its being rolled or hammered, either as steel or wrought-iron, for the market, is to free it from the superabundant carbon, and from the impurities referred to.

The process usually adopted for this purpose is, in the first instance, that known as "puddling," or its equivalent, which consists, substantially, in exposing the cast-iron for a certain period, in a melted state, and under constant stirring, to the oxygen of ordinary atmospheric air, the effect of which is to remove the carbon and impurities in a more or less perfect degree. But notwithstanding the innumerable efforts made by iron-masters to improve this process, it still remains extremely defective, involving much loss of metal, a great waste of fuel and of human labor, and an imperfect separation of the sulphur and phosphorus.

This results mainly from the imperfect mingling which, by any practice heretofore adopted, has been obtained between the fluid iron operated on in the puddling or other equivalent furnace, and the purifying-elements and ingredients applied to it therein to convert it into "puddled steel," or malleable iron.

The object of my invention is to so treat or prepare the cast-iron, as a preliminary to its being subjected to the manipulations of the puddling or other process designed to improve its character, or to convert it into steel or wrought-iron, that it can be much more readily and efficiently combined or mixed with the oxygen, oxides, or other purifying-agents or ingredients which it may be desired to apply to it, by which means I am enabled to greatly economize labor and fuel, and to produce a more satisfactory puddled steel than has hitherto been known.

The method or process by which I effect this, consists in first dividing the cast-iron, in the condition in which it is left by the smelting-operation, into minute pieces, flakes, grains, or powder, by mechanical means and then mixing it, in a solid state, and in this minutely-divided condition, with the oxides or other ingredients or agents designed to improve or purify it, or to aid in its conversion into steel or malleable iron, while such oxides or ingredients or agents are also in a solid state, and afterward subjecting it to the puddling-process, or other manipulation intended to free it from its excess of carbon, and from its impurities, so that in such manipulation, the requisite mixture of the fluid iron and purifying-agents may be secured in the highest practicable degree.

Various modes of performing the subdivision of the cast-iron may be adopted. One method which may be successfully employed is, to run the iron, in a melted state, either direct from the blast-furnace hearth, or after it has been melted in any suitable melting-furnace, between revolving rollers or cylinders, or between a roller and a flat surface, or between two moving surfaces, of cast-iron or other suitable hard substance, whereby the fluid iron will, by contact therewith, become solid, and at the same instant be pressed, rubbed, broken, or ground into the requisite finely-divided, granulated, or powdered condition, suitable for the subsequent stages of my process.

In this condition, and while thus solid, I mix with it the oxides or other ingredients or agents designed to improve or purify it, or to aid in its conversion into steel or malleable iron, such oxides, ingredients, or agents being also in a solid state, and it may then be subjected to the ordinary or any other process of making puddled steel, or to any desired treatment adapted to improve its character, or to manufacture it into balls, blooms, or slabs.

It will be obvious, without demonstration, that as the conversion of crude iron into steel or malleable iron is mainly a chemical operation, the process must necessarily be most quickly and perfectly performed when the material is in a condition to be most thoroughly penetrated in every part of its mass by the purifying oxygen and other chemical reagents applied to it. This result my invention is adapted to secure in a highly successful degree, with the saving of a large part of the costly and tedious manual labor required in ordinary puddling, and in these important advantages lies its practical value.

In the accompanying drawing—

A A are two rolls of cast-iron or other suitable material, preferably hollow, and supported on strong iron frames or standards, B B, in the usual manner in which rollers are mounted, for crushing minerals and other substances. These rolls are preferably grooved into each other, as represented, and one is preferably of larger diameter than the other.

C C are stout cog-wheels or pinions, each of the same diameter, and geared to work together, so that the axes of the rolls will rotate at the same speed, while their peripheries, because of different diameters, will rotate at different speeds, and thereby cause not only a crushing, but also a rubbing and grinding action, upon anything passed between them.

D D are levers, which are so attached to the carriage or bearings of one of the rolls, that suitable weights, W W, or their equivalent, will constantly tend to press the rolls together, but should anything clog the latter, will permit them to open sufficiently to allow its passage without breaking the machinery.

After these rolls have been put in motion, the fluid cast-iron is poured, preferably in a small stream, between them, the rolls being kept constantly cool by water circulating inside of them, or by any other convenient means, in order to prevent their being injured by the heat of the fluid iron.

If preferred, any ingredients or agents which may be desired to be intimately mixed with the crude iron, either to aid in purifying or improving it, or to prevent it from clogging or attaching itself to the rolls, or for any other purpose, may be caused to pass between the rolls with the stream of fluid material which is to be treated.

When desired, also, the minutely-divided iron, in a solid state, and the oxides or other ingredients or agents, in a solid state, may be mixed together in the puddling or other furnace before any portion or any considerable portion of them is melted.

It will be found, in practice, that my improvement will be of much practical value for use in preparing crude iron which is to be subjected to the so-called "Ellershausen process" recently patented.

I do not confine myself to any particular apparatus or means for effecting the minute division of the cast-iron; but having thus described my invention,

What I claim as new, and desire to secure by Letters Patent, is—

1. As a preparatory step in the conversion of crude iron into steel or malleable iron, mechanically dividing cast-iron into pieces, flakes, grains, or powder, by running it, in a fluid state, either alone or mixed with other substances, between rollers or other suitable moving and crushing-surfaces, substantially as and for the purposes described.

2. The process of converting crude iron into steel, or malleable iron, by subjecting to the puddling-process or any other suitable treatment, iron which has first been reduced, in the manner above described, from a melted state, either alone or together with other substances, to pieces, flakes, grains, or powder, and then mixed, in this solid state, with oxides or other ingredients or agents, also in a solid state, either before being placed in the puddling or other furnace, or in such furnace before any considerable portion of them is melted, substantially as and for the purposes set forth.

JOHN PLAYER.

Witnesses:
    JAMES HENDERSON,
    T. B. BEECHER.